United States Patent
Sato et al.

(10) Patent No.: US 8,705,961 B2
(45) Date of Patent: Apr. 22, 2014

(54) OPTICAL PACKET SWITCHING SYSTEM AND OPTICAL PACKET TRANSMITTER DEVICE

(75) Inventors: Reiko Sato, Kawasaki (JP); Takashi Fujiki, Kawasaki (JP)

(73) Assignee: Fujitsu Telecom Networks Limited (JP)

( * ) Notice: Subject to any disclaimer, the term of this patent is extended or adjusted under 35 U.S.C. 154(b) by 136 days.

(21) Appl. No.: 13/327,542

(22) Filed: Dec. 15, 2011

(65) Prior Publication Data

US 2012/0155860 A1    Jun. 21, 2012

(30) Foreign Application Priority Data

Dec. 16, 2010    (JP) ................. 2010-280659

(51) Int. Cl.
*H04J 14/00*    (2006.01)
*H04Q 11/00*    (2006.01)

(52) U.S. Cl.
CPC ................. *H04Q 11/0066* (2013.01)
USPC ................. 398/51; 398/53; 398/54

(58) Field of Classification Search
USPC ................. 398/45–49, 51–54
See application file for complete search history.

(56) References Cited

U.S. PATENT DOCUMENTS

| | | | | |
|---|---|---|---|---|
| 6,118,793 | A * | 9/2000 | Chen | 370/470 |
| 7,835,278 | B2 * | 11/2010 | Hesse et al. | 370/230 |
| 8,238,239 | B2 * | 8/2012 | Wadekar et al. | 370/230 |
| 2009/0097401 | A1 * | 4/2009 | Diab | 370/230 |
| 2009/0169218 | A1 * | 7/2009 | Nonaka et al. | 398/154 |

FOREIGN PATENT DOCUMENTS

| | | |
|---|---|---|
| JP | 02-186898 A | 7/1990 |
| JP | 2008-167054 A | 7/2008 |
| JP | 2008-235986 | 10/2008 |
| JP | 2009-194840 A | 8/2009 |

OTHER PUBLICATIONS

Notification of Reason(s) for Refusal for Japanese application No. 2010-280659 issued by the Japanese Patent Office on Dec. 17, 2013 with English Translation, 4 pages.

* cited by examiner

*Primary Examiner* — Dalzid Singh
(74) *Attorney, Agent, or Firm* — Christie, Parker & Hale LLP

(57) ABSTRACT

An optical packet switching system includes: an optical packet transmitter device configured to transmit an optical packet signal; and an optical packet switching device configured to route and output an input optical packet signal. The optical packet transmitter device is configured to adjust gap time between optical packets transmitted. The optical packet transmitter device adjusts the gap time to a fixed value defined by time required for switching in the optical packet switching device.

6 Claims, 6 Drawing Sheets

OPTICAL PACKET SWITCHING SYSTEM AND OPTICAL PACKET TRANSMITTER DEVICE

CROSS-REFERENCE TO RELATED APPLICATION

This application claims priority to and the benefit of Japanese Patent Application No. 2010-280659, filed on Dec. 16, 2010.

BACKGROUND OF THE INVENTION

1. Field of the Invention

The present invention relates to an optical packet switching system in which packet-by-packet optical packet switching is enabled and to an optical packet transmitter device used in the optical packet switching system.

2. Description of the Related Art

The technology of switching the path depending on the wavelength in an optical transmission system based on wavelength division multiplexing (WDM) and by employing a wavelength selective switch (WSS) is in practical use. One of the next-generation technologies studied is an optical packet switching system in which the path is switched in smaller units, namely, IP packets (10 Gigabit Ethernet (registered trademark) signals, etc.). Each packet is converted in format into an optical packet and routed by using an ultrahigh-speed optical switch (see e.g., patent document No. 1).

When the transmission is based on IP packets, no significant information is transmitted absent any data so that the bandwidth is wasted accordingly. If the optical packet switching system is realized, however, any idle time in which data is absent can be occupied by another packet. Therefore, the optical packet switching system promises the possibility of dramatically increasing the bandwidth usage efficiency of the transmission path and is envisaged as a technology of the future.

[patent document No. 1] JP 2008-235986

In the optical packet switching system, there is a need to secure gap time between optical packets commensurate with time required for the switching of optical packet signals.

FIG. 1 shows the gap time between optical packet signals. FIG. 1 shows a client signal, optical packet signals at wavelengths λ1-λ10 produced by causing the client signal to branch, and how the optical packet switching device is turned on or off. In FIG. 1, "PA" denotes a preamble and "IFG" denotes an inter-frame gap.

Referring to FIG. 1, optical packet signals are output at time intervals commensurate with the duration of the Ether frame of the client signal. As shown in FIG. 1, time required for switching in the optical packet switching device is secured and optical packet signals can be properly routed, by providing gap time between optical packet signals.

In addition to the client signal, an optical packet signal includes optical routing information, etc. For this reason, the length of an optical packet signal is not 1/N the frame length of the client signal even if the client signal is wavelength-divided by N (N is an integer equal to or greater than 2). The length of an optical packet signal is longer than 1/N the frame length. As the length of an optical packet signal at each wavelength grows larger than the length of a client signal, the gap time will be reduced with the result that sufficient time cannot be secured for switching. FIG. 2 shows how an optical packet signal is discarded because of failure to secure sufficient time for optical switching.

SUMMARY OF THE INVENTION

The present invention addresses the background as described above and a purpose thereof is to provide a technology capable of reducing the ratio of discarded optical packet signals.

The optical packet switching system according to an embodiment of the present invention comprises: an optical packet transmitter device configured to transmit an optical packet signal; and an optical packet switching device configured to route and output an input optical packet signal. The optical packet transmitter device is configured to adjust gap time between optical packets transmitted.

Another embodiment of the present invention relates to an optical packet transmitter device. The device is for use in an optical packet switching system including an optical packet switching device, and is configured to adjust gap time between optical packets transmitted.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will be given of an embodiment of the present invention with reference to the drawings.

(First Embodiment)

Figure 1:
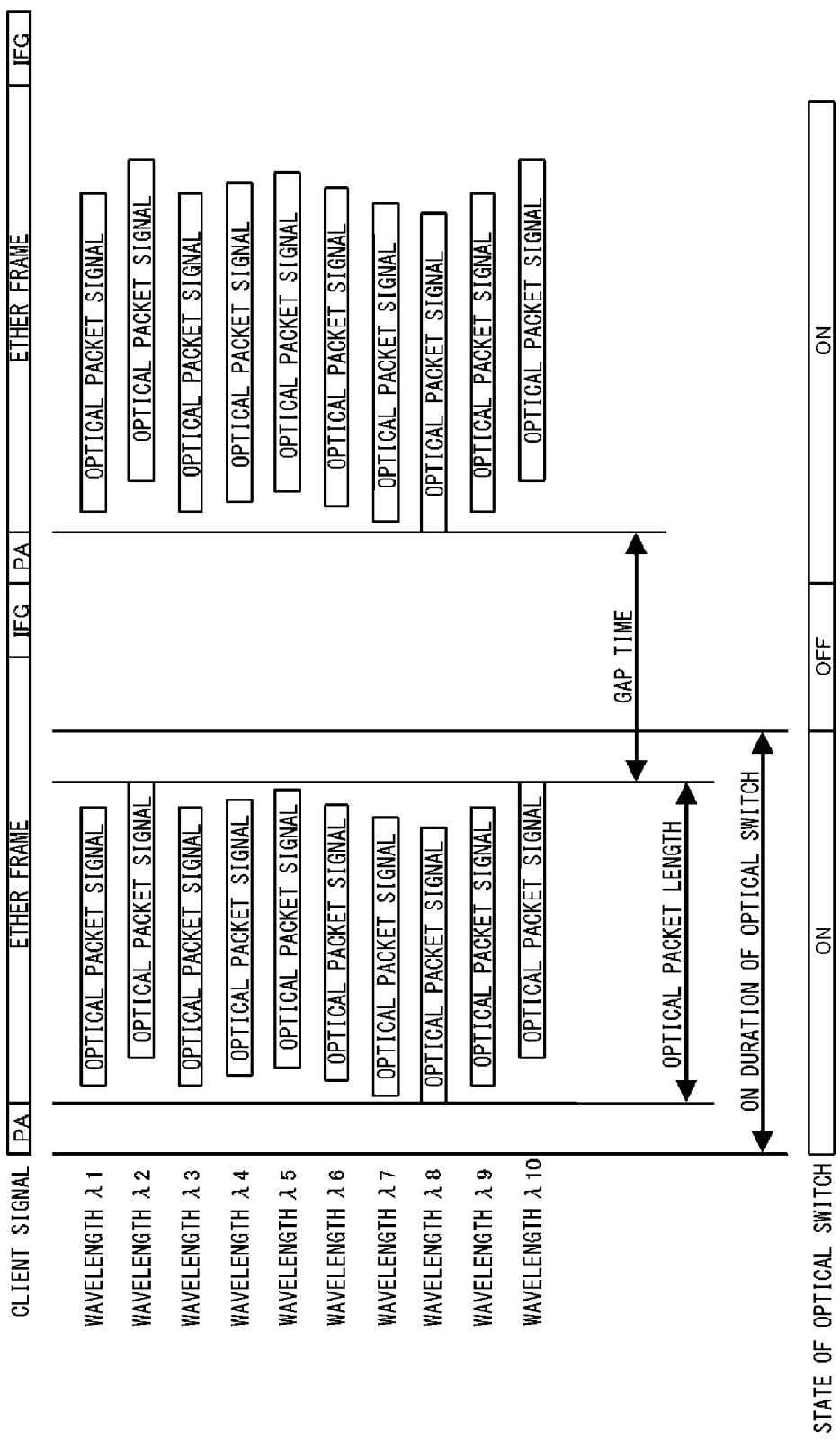
FIG. 1 shows the gap time between optical packets.
Figure 2:
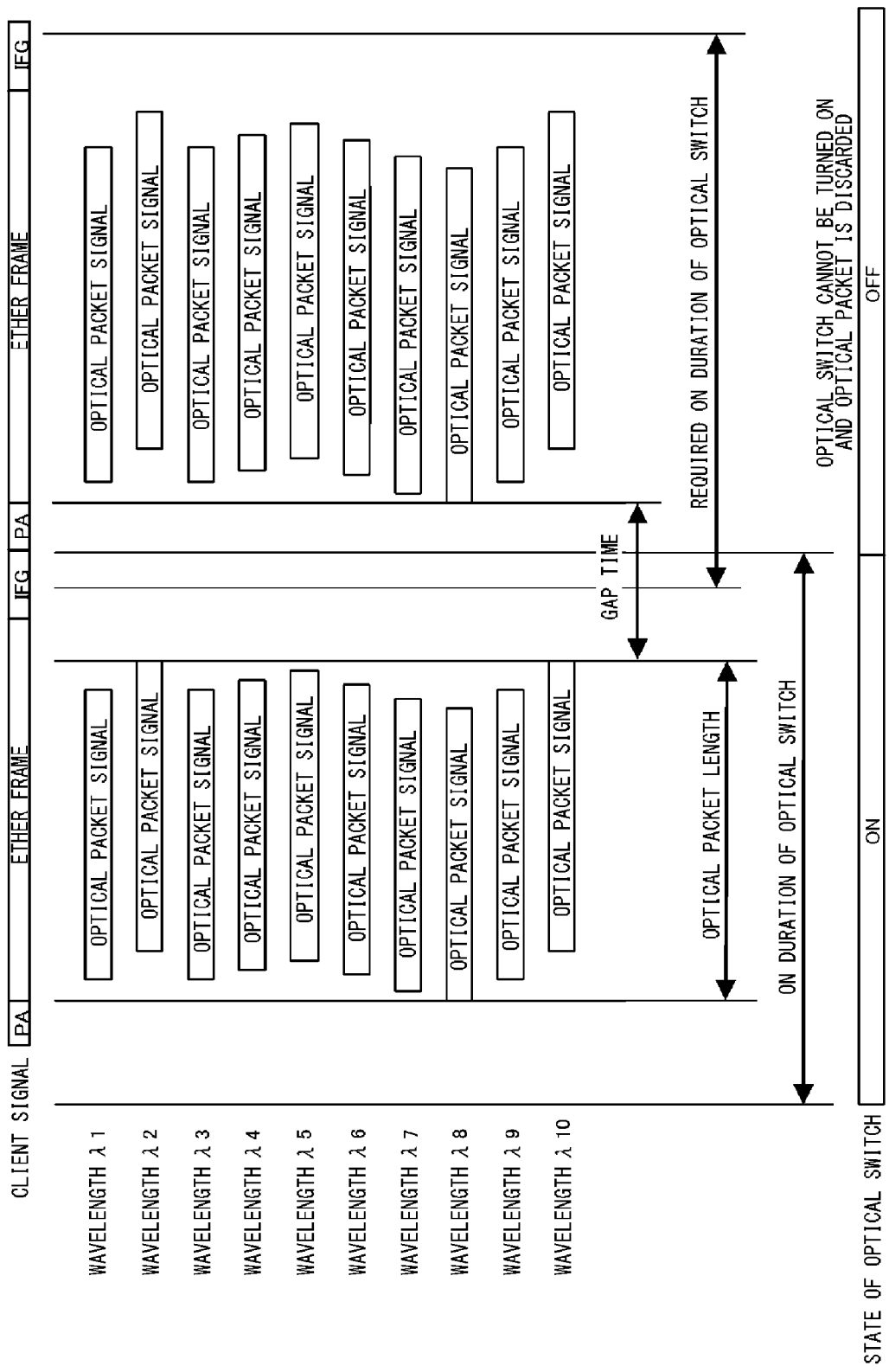
FIG. 2 shows the gap time between optical packets.
Figure 3:
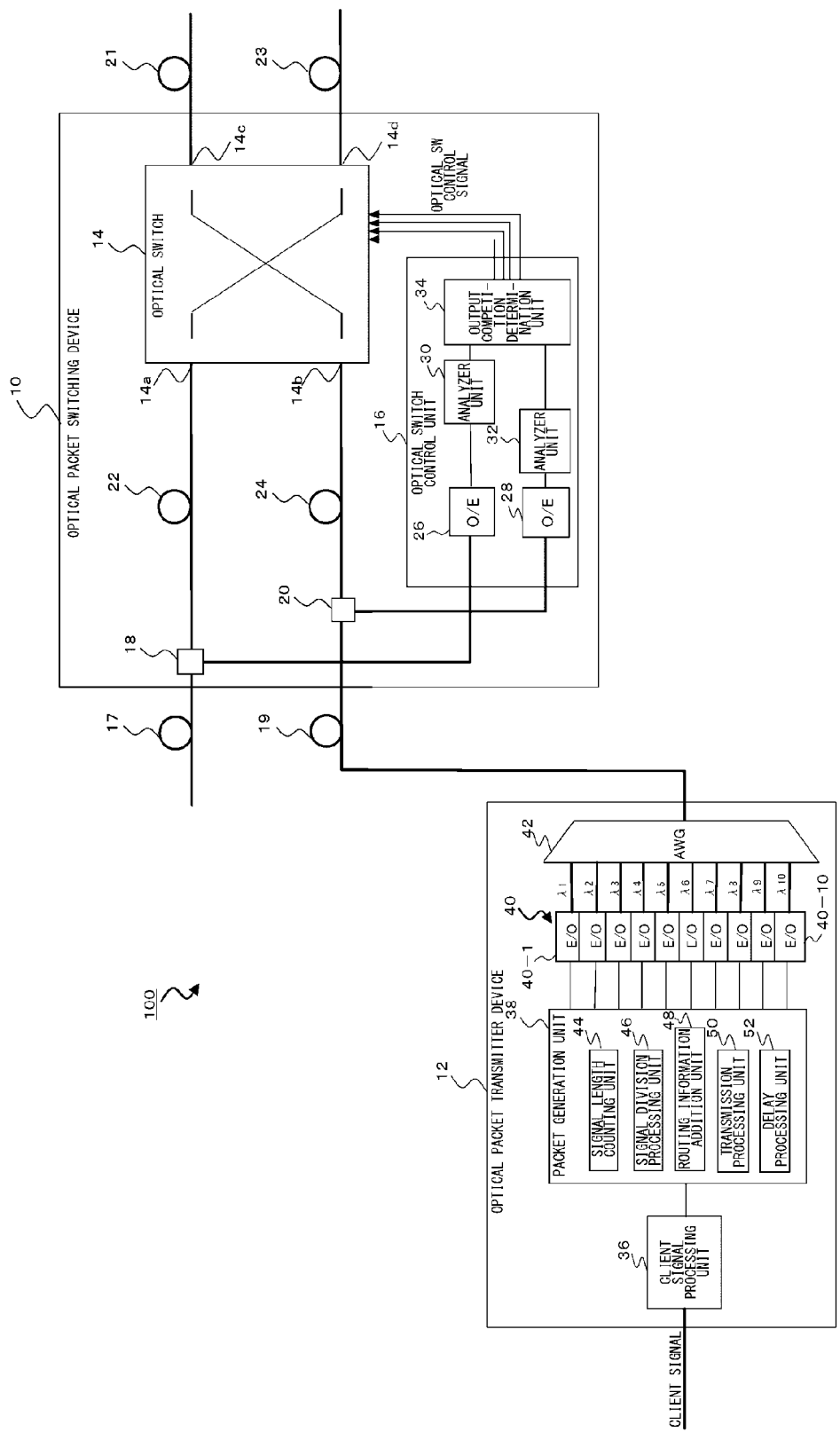
FIG. 3 shows an optical packet switching system according to the first embodiment.

FIG. 3 shows an optical packet switching system according to the first embodiment of the present invention. As shown in FIG. 3, an optical packet switching system 100 comprises a 2-input×2-output optical packet switching device 10 and an optical packet transmitter device 12.

A description will first be given of the optical packet switching device 10 The optical packet switching device 10 is provided with the function of switching the path of, i.e., routing, an input optical packet signal and outputting the signal accordingly. As shown in FIG. 3, the optical packet switching device 10 comprises an optical switch 14, an optical switch control unit 16, a first optical coupler 18, a second optical coupler 20, a first optical delay line 22, and a second optical delay line 24.

The optical packet signal input to the optical packet switching device 10 via an optical transmission path 17 is input to the first optical coupler 18. The first optical coupler 18 causes the optical packet signal to branch into two signals. One of the optical packet signal from the branch is input to a first input port 14a of the optical switch 14 via the first optical delay line 22. The other optical packet signal is input to the optical switch control unit 16.

An optical packet signal input to the optical packet switching device 10 via another optical transmission path 19 is input to the second optical coupler 20. In the first embodiment, the optical transmission path 19 is connected to the optical packet transmitter device 12. The second optical coupler 20 causes the optical packet signal to branch into two signals. One of the optical packet signals from the branch is input to a second input port 14b of the optical switch 14 via the second optical delay line 24. The other optical packet signal is input to the optical switch control unit 16.

The optical switch control unit 16 extracts routing information from the input optical packet signal and outputs a control signal to the optical switch 14 in accordance with the routing information. As shown in FIG. 3, the optical switch control unit 16 is provided with a first optical/electrical converter unit 26, a second optical/electrical converter unit 28, a first analyzer unit 30, a second analyzer unit 32, and an output competition determination unit 34.

The first optical/electrical converter unit 26 converts an optical packet signal received from the first optical coupler 18 into an electrical signal. The second optical/electrical converter unit 28 converts an optical packet signal received from the second optical coupler 20 into an electrical signal.

The first analyzer unit 30 analyzes the header of the packet signal received from the first optical/electrical converter unit 26 and detects the routing information. The second analyzer unit 32 analyzes the header of the packet signal received from the second optical/electrical converter unit 28 and detects the routing information.

The output competition determination unit 34 determines whether the optical packet should be transmitted or discarded and outputs an optical switch control signal based on the result of determination. For example, it will be assumed that optical packets are input to the first input port 14a and the second input port 14b and that the destination of output of the two optical packets is the first output port 14c. In this case, the output competition determination unit 34 determines whether the two optical packets compete. In other words, the output competition determination unit 34 determines whether the two optical packets concur in time. If the two optical packets compete, the optical packet arriving first is transmitted and the following optical packet is discarded.

In this embodiment, the optical switch 14 is a 2×2 optical switch For example, the optical switch 14 may be implemented by a semiconductor optical amplifier. The optical switch 14 is controlled to be turned on or off by an optical switch control signal from the optical switch control unit 16 and routes and outputs the input optical packet signal.

The first optical delay line 22 and the second optical delay line 24 delay one of the optical packet signals from the branch for a duration required for the optical switch control unit 16 to generate an optical switch control signal. By providing the first optical delay line 22 and the second optical delay line 24, on/off of the optical switch 14 can be controlled to be synchronized with the timing of arrival of the optical packet signals at the optical switch 14.

The optical packet signal output from the first output port 14c of the optical switch 14 is output to a first optical transmission path 21. The optical packet signal output from the second output port 14d of the optical switch 14 is output to another optical transmission path 23.

A description will now be given of the optical packet transmitter device 12. The optical packet transmitter device 12 is provided with the function of causing a client signal received from a client device (not shown) to branch into optical packet signals at a plurality of wavelengths and transmitting the signals. As shown in FIG. 3, the optical packet transmitter device 12 is provided with a client signal processing unit 36, a packet generation unit 38, an electrical/optical converter unit 40, and an arrayed waveguide grating (AWG) 42.

The client signal processing unit 36 subjects a received client signal to a predetermined process before outputting the signal to the packet generation unit 38. The client signal processing unit 36 buffers the received client signal.

The packet generation unit 38 is provided with a signal length counting unit 44, a signal branch processing unit 46, a routing information addition unit 48, a transmission processing unit 50, and a delay processing unit 52.

The signal length counting unit 44 counts the length of the received signal. The signal branch processing unit 46 causes the client signal to branch into a predetermined number of (10, in the case of the first embodiment) packet signals based on information on the length of the client signal from the signal length counting unit 44.

The routing information addition unit 48 adds routing information to each of the packet signals from the branches. The transmission processing unit 50 adds a preamble to the head of each packet signal and outputs the signal to the electrical/optical converter unit 40. The delay processing unit 52 controls the timing according to which the transmission processing unit 50 outputs the packet signal to the electrical/optical converter unit 40. By controlling the timing of outputting the packet signal using the delay processing unit 52, the gap time between the optical packet signals can be adjusted.

10 packet signals generated by the packet generation unit 38 are input to the electrical/optical converter unit 40. The electrical/optical converter unit 40 comprises 10 E/O modules 40-1-40-10. The E/O module convert the packet signals from the packet generation unit 38 into optical packet signals at wavelengths $\lambda 1$-$\lambda 10$. The optical packet signals output from the electrical/optical converter unit 40 are input to the AWG 42. The AWG 42 subjects the optical packet signals at the wavelengths $\lambda 1$-$\lambda 10$ to wavelength multiplexing and outputs the signals to the optical transmission path 19.

Figure 4:
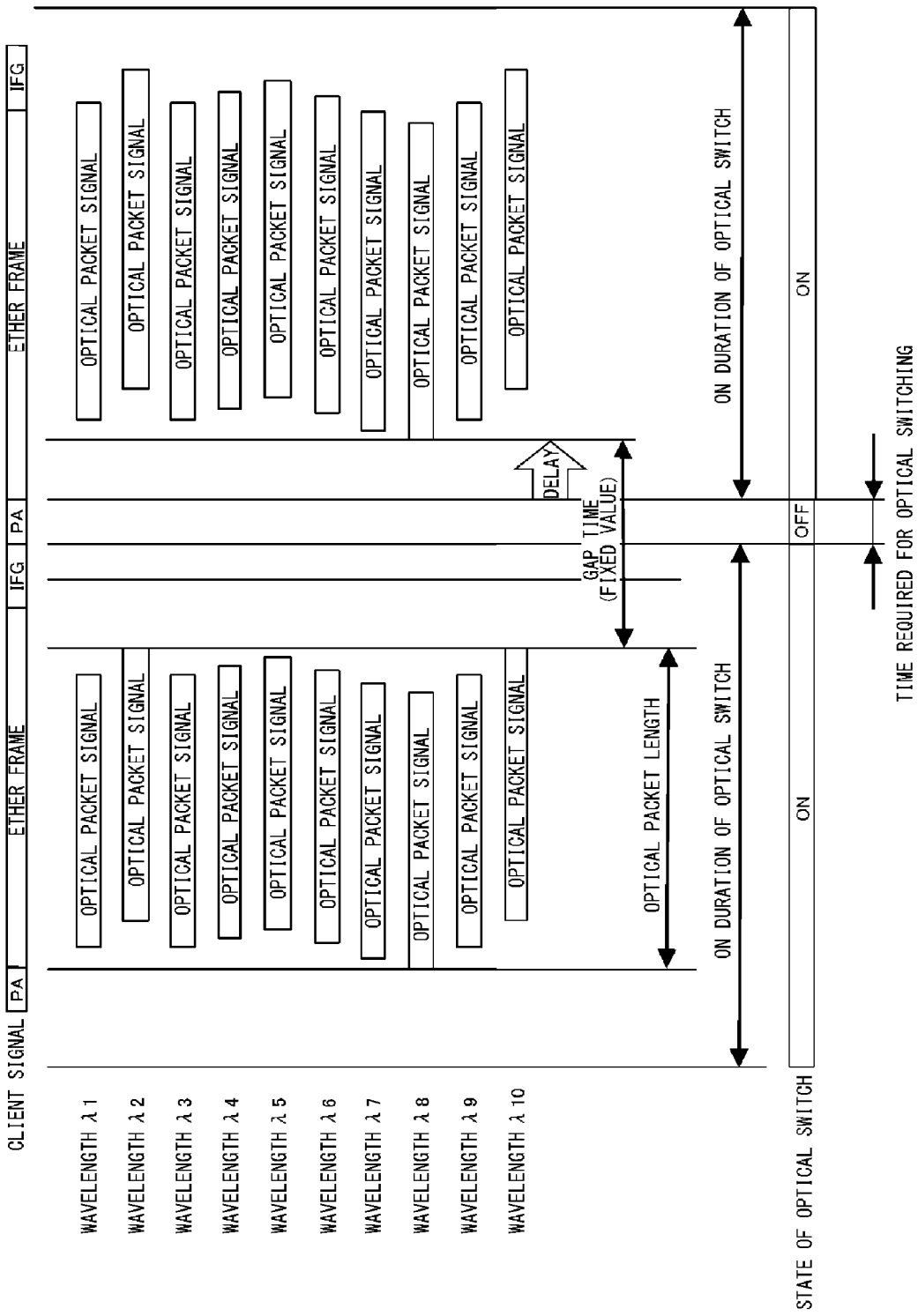
FIG. 4 illustrates the operation of the optical packet transmitter device in the optical packet switching system according to the first embodiment.

FIG. 4 illustrates the operation of the optical packet transmitter device in the optical packet switching system according to the first embodiment. According to the first embodiment, the delay processing unit 52 of the optical packet transmitter device 12 controls the timing of outputting the packet signal so that the gap time between optical packet signals is a predetermined fixed value. The fixed value is determined in accordance with time required for the optical packet switching device 10 to perform a switching process (switching time) and is defined to be longer than the time required for optical switching.

FIG. 4 shows that the gap time of a desired length is secured between optical packet signals by causing the delay processing unit 52 to delay the start timing of the optical packet signals with respect to the start timing of the Ether frame. This secures sufficient switching time in the optical packet switching device 10 so that the ratio of discarded packets is reduced.

(Second Embodiment)

Figure 5:
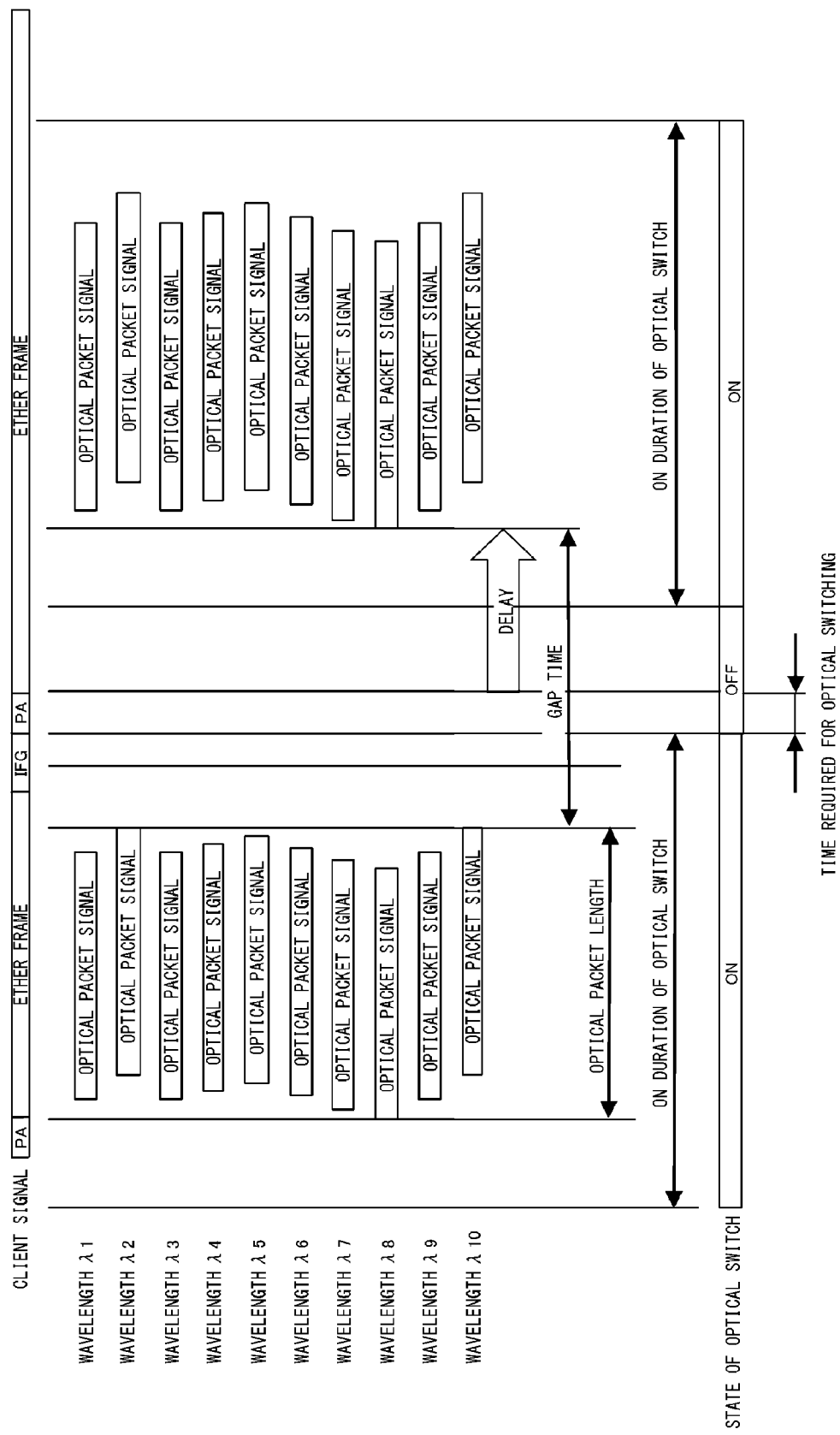
FIG. 5 illustrates the operation of the optical packet switching device in the optical packet switching system according to the second embodiment.

FIG. 5 shows the operation of the optical packet switching device in the optical packet switching system according to a second embodiment of the present invention. The components of the optical packet switching system according to the second embodiment are basically identical to the components of the optical packet switching system shown in FIG. 3 and so are denoted by like symbols. A detailed description is omitted.

The operation of the delay processing unit 52 of the optical packet transmitter device 12 in the optical packet switching system 100 according to the second embodiment differs from that of the first embodiment. In the first embodiment, the delay processing unit 52 adjusts the timing of outputting an optical packet signal so that the gap time between packet signals has a fixed value. In the second embodiment, the delay processing unit 52 controls the timing of outputting a packet signal and adjusts the gap time in accordance with the length of a client signal (length of an Ethernet frame). Information on the length of the client signal is obtained from the signal length counting unit 44. More specifically, the delay processing unit 52 adjusts the gap time so that transmission of an optical packet signal occurs substantially in the middle of the client signal, as shown in FIG. 5.

FIG. 5 shows that optical packet signals are located substantially in the middle of the Ether frame and sufficient gap time is secured between optical packet signals, by delaying the start timing of optical packet signals from the start timing of the Ether frame. According to the second embodiment, additional margin is created for switching control in the optical packet switching device 10 so that the ratio of discarded packets is further reduced.

(Third Embodiment)

Figure 6:
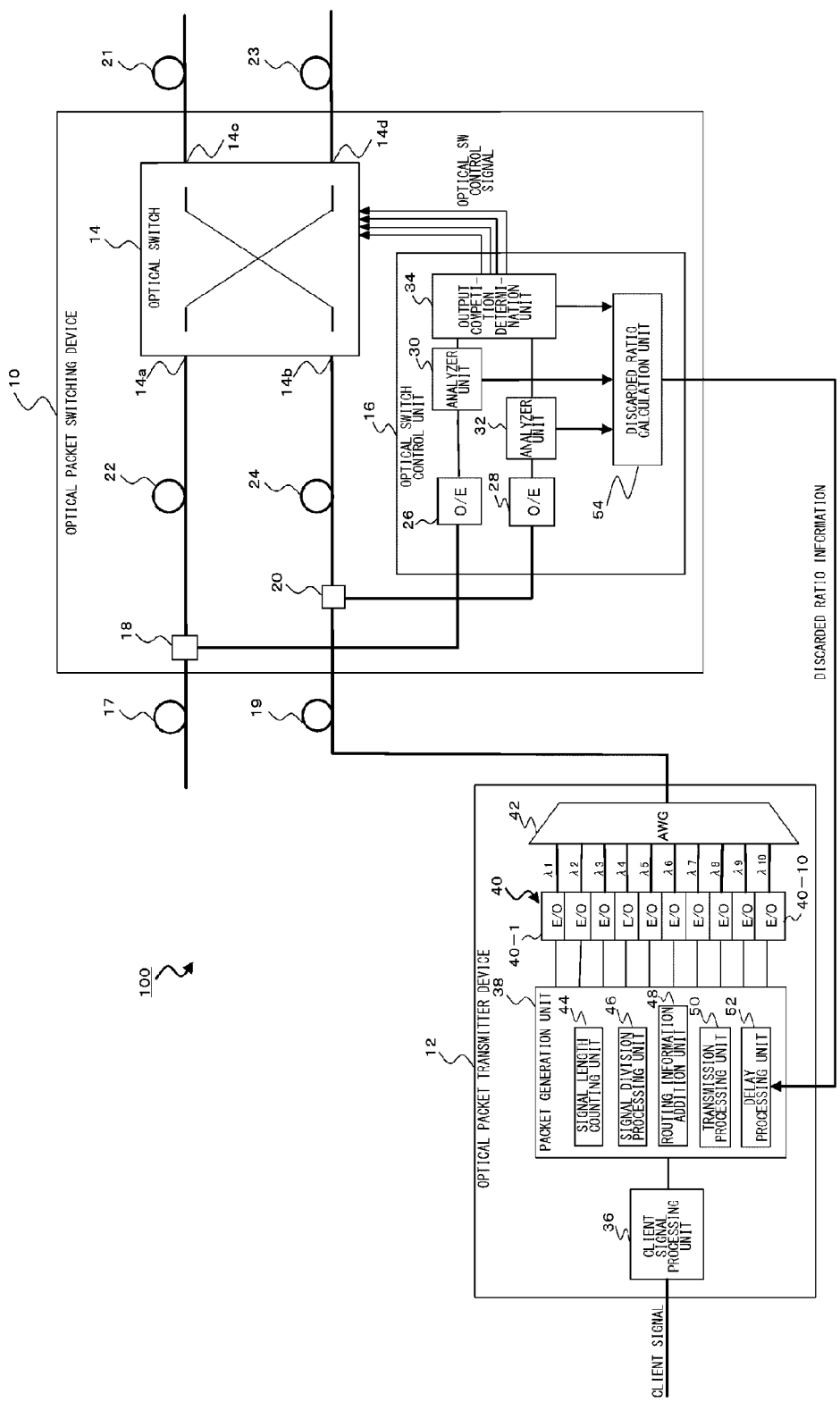
FIG. 6 shows an optical packet switching system according to the third embodiment.

FIG. 6 shows an optical packet switching system according to a third embodiment of the present invention. Those components of the optical packet switching system 100 shown in FIG. 5 that are identical or corresponding to the components of the optical packet switching system shown in FIG. 3 are denoted by like symbols and a detailed description is omitted.

In optical packet switching in the optical packet switching device 10, optical packet signals from a specific input port could be more likely to be discarded than those from the other ports. The third embodiment addresses this by feeding back information on the ratio of discarded optical packets to the optical packet transmitter device 12 and adjusting the gap time so that the ratio of discarded packets is reduced.

The optical switch control unit 16 of the optical packet switching device 10 in the optical packet switching system 100 according to the third embodiment further comprises a discarded ratio calculation unit 54 in addition to the components shown in FIG. 3 of the first optical/electrical converter unit 26.

Information on the number of optical packets received at the respective ports of the optical switch 14 is input to the discarded ratio calculation unit 54 from the first analyzer unit 60 and the second analyzer unit 62. Information on the number of discarded optical packets is input to the discarded ratio calculation unit 54 from the output competition determination unit 34. The discarded ratio calculation unit 54 calculates the ratio of discarded optical packets for each input port, based on the information. The optical packet switching device 10 routes optical packets by reading transmission source information and destination information from the header of optical packet signals. The ratio of discarded packets can be calculated for each input port of the optical switch 14 by referring to the transmission source information of discarded optical packet signals.

Information on the ratio of discarded packets calculated in the discarded ratio calculation unit 54 is transmitted to the respective optical packet transmitter devices connected to the optical packet switching device 10. Since the optical packet transmitter device 12 is connected to the second input port of the optical switch 14 according to this embodiment, the ratio of discarded optical packet signals received at the second input port 14b is transmitted to the optical packet transmitter device 12. Meanwhile, the radio of discarded optical packet signals received at the first input port 14a is transmitted to the optical packet transmitter device (not shown) connected to the first input port 14a.

As shown in FIG. 6a, information on the ratio of discarded packets is input to the delay processing unit 52 of the optical packet transmitter device 12. The delay processing unit 52 adjusts the gap time between optical packet signals based on the information on the ratio of discarded packets. More specifically, if the ratio of discarded packets is equal to or greater than a predetermined reference value, the delay processing unit 52 delays the timing of outputting packet signals by, for example, 1 byte or several clocks in each step so as to extend the gap time. The delaying step is repeated until the ratio of discarded packets fed back from the discarded ratio calculation unit 54 of the optical packet switching device 10 is below the predetermined reference value. This can suitably reduce the ratio of discarded packets.

If the gap time is extended longer than a standard packet length of client signals, some optical packets cannot be transmitted. Therefore, it is desirable that the maximum value of the gap time is approximately the value obtained by subtracting the minimum necessary gap time from the standard packet length of client signals. In this embodiment, the optical packet switching device 10 is assumed to be a 2×2 device. In the case of an optical packet switching device configured for more inputs and more outputs, the likelihood of congestion of optical packet signals will be increased. The optical packet switching device 10 according to the embodiment is particularly suitable for such a case.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An optical packet switching system, comprising:
    an optical packet transmitter device configured to transmit an optical packet signal; and
    an optical packet switching device configured to route and output an input optical packet signal,
    wherein the optical packet transmitter device is configured to adjust gap time between optical packets transmitted, and
    the optical packet transmitter device is configured to cause an input client signal to branch into a plurality of optical packet signals and adjust the gap time so that transmission of an optical packet signal occurs substantially in the middle of the client signal.

2. An optical packet switching system, comprising:
    an optical packet transmitter device configured to transmit an optical packet signal; and
    an optical packet switching device configured to route and output an input optical packet signal,
    wherein the optical packet transmitter device is configured to adjust gap time between optical packets transmitted,
    the optical packet switching device is configured to detect a ratio of discarded optical packet signals and transmit information on the ratio of discarded optical packet signals to the optical packet transmitter device, and the optical packet transmitter device is configured to adjust the gap time based on the information on the ratio of discarded optical packet signals.

3. The optical packet switching system according to claim 2, wherein, when the ratio of discarded optical packet signals is equal or greater than a predetermined reference value, and the optical packet transmitter device is configured to extend the gap time so that the ratio of discarded optical packet signals is below the predetermined reference value.

4. An optical packet transmitter device for use in an optical packet switching system including an optical packet switching device, wherein the optical packet transmitter device is configured to adjust gap time between optical packets transmitted, and the optical packet transmitter device is configured to cause an input client signal to branch into a plurality of optical packet signals and adjust the gap time so that transmission of an optical packet signal occurs substantially in the middle of the client signal.

5. An optical packet transmitter device used in an optical packet switching system including an optical packet switching device, wherein the optical packet transmitter device is configured to adjust gap time between optical packets transmitted, wherein the gap time is adjusted based on the information on the ratio of discarded optical packet signals sent from the optical packet switching device.

6. The optical packet transmitter device according to claim 5, wherein, when the ratio of discarded optical packet signals is equal or greater than a predetermined reference value, the optical packet transmitter device is configured to extend the gap time so that the ratio of discarded optical packet signals is below the predetermined reference value.

* * * * *